US012731367B2

(12) United States Patent
Wang et al.

(10) Patent No.: US 12,731,367 B2
(45) Date of Patent: Sep. 8, 2026

(54) METHOD AND APPARATUS FOR PEDESTRIAN BODY PART FEATURE EXTRACTION AND TERMINAL DEVICE

(71) Applicant: UBTECH ROBOTICS CORP LTD, Shenzhen (CN)

(72) Inventors: Kan Wang, Shenzhen (CN); Jianxin Pang, Shenzhen (CN); Huan Tan, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 340 days.

(21) Appl. No.: 18/533,199

(22) Filed: Dec. 8, 2023

(65) Prior Publication Data

US 2024/0221345 A1 Jul. 4, 2024

(30) Foreign Application Priority Data

Dec. 29, 2022 (CN) ........................ 202211714515.9

(51) Int. Cl.

| | |
|---|---|
| ***G06V 10/42*** | (2022.01) |
| ***G06V 10/77*** | (2022.01) |
| ***G06V 10/774*** | (2022.01) |
| ***G06V 10/82*** | (2022.01) |
| ***G06V 40/10*** | (2022.01) |

(52) U.S. Cl.

CPC .......... *G06V 10/42* (2022.01); *G06V 10/7715* (2022.01); *G06V 10/774* (2022.01); *G06V 10/82* (2022.01); *G06V 40/10* (2022.01)

(58) Field of Classification Search

CPC .. G06V 10/42; G06V 10/454; G06V 10/7715; G06V 10/774; G06V 10/82; G06V 40/10; G06V 40/103; Y02T 10/40

See application file for complete search history.

(56) References Cited

U.S. PATENT DOCUMENTS

| | | | | |
|---|---|---|---|---|
| 2021/0089807 | A1* | 3/2021 | Liu | G06V 20/70 |
| 2022/0075994 | A1* | 3/2022 | Shapira | G06F 18/214 |
| 2022/0148328 | A1* | 5/2022 | Ye | G06N 3/084 |
| 2023/0080876 | A1* | 3/2023 | Miyamoto | G06V 10/25 382/190 |
| 2023/0281757 | A1* | 9/2023 | Zhang | G06T 3/4007 |

OTHER PUBLICATIONS

Fukui et al., "Attention Branch Network: Learning of Attention Mechanism for Visual Explanation," Proceedings of the IEEE/CVF Conference on Computer Vision and Pattern Recognition (CVPR), 2019, pp. 10705-10714. (Year: 2019).*

"Research on Feature Extraction Method of Pedestrian Re-Identification Based on Deep Learning", Kan Wang; "Wanlang Theses", Nov. 1, 2022, pp. 80-121.

* cited by examiner

*Primary Examiner* — Kenny A Cese

(57) ABSTRACT

A method for pedestrian body part feature extraction is provided, including: performing global feature extraction on a target pedestrian image to obtain a global feature map; learning each of body parts in the global feature map using a self-produced supervision signals-based self-regulated channel attention model to output first channel attention vectors each describing a respective one of the body parts; weighting the first channel attention vectors with the global feature map to obtain a weighted feature map describing the body parts; and extracting body part features of the target pedestrian image from the weighted feature map.

20 Claims, 6 Drawing Sheets

METHOD AND APPARATUS FOR PEDESTRIAN BODY PART FEATURE EXTRACTION AND TERMINAL DEVICE

CROSS REFERENCE TO RELATED APPLICATIONS

The present disclosure claims the benefit of priority under the Paris Convention to Chinese Patent Application No. 202211714515.9 filed on Dec. 29, 2022, which is incorporated herein by reference in its entirety.

BACKGROUND

1. Technical Field

The present disclosure relates to the field of image processing, and in particular to a method and apparatus for pedestrian body part feature extraction, and a terminal device.

2. Description of Related Art

Pedestrian re-identification is a technique for using computer vision technology to determine whether a particular pedestrian exists in an image or video, and has become a research hotspot in the field of video analysis due to its wide application in the fields such as video surveillance, social security, etc. However, a pedestrian re-identification task mainly depends on high-quality pedestrian features. Therefore, how to extract high-quality pedestrian features has always been a difficulty in the pedestrian re-identification task. As shown in FIGS. 1A-1C, various reasons, such as changes in external illumination, inaccurate pedestrian detection, or changes in postures of the pedestrian, will increase the difficulty of extracting pedestrian features to some extent.

In current methods for extracting pedestrian features, a very popular and effective method is to extract pedestrian body part features first and then combine local pedestrian body part features into a global pedestrian feature. This type of method often requires body part detection to localize features of body parts when extracting the features of the body parts. However, the operation of body part detection inevitably brings additional computational overhead. In addition, for low-quality pedestrian images with problems such as image blurring, body part detection often fails to accurately localize the body parts, which affects, for example, the quality of the extracted pedestrian body part features.

BRIEF DESCRIPTION OF THE DRAWINGS

In order to describe the technical schemes in the embodiments of the present disclosure more clearly, the following briefly introduces the accompanying drawings required for describing the embodiments. It should be understood that, the accompanying drawings in the following description merely show some embodiments and should not be considered as limiting the scope. For those skilled in the art, other drawings can be obtained according to the drawings without creative efforts.

DETAILED DESCRIPTION

The technical solutions in the embodiments of the present disclosure will be clearly and completely described below with reference to the accompanying drawings in the embodiments of the present disclosure.

Components in the embodiments of the present disclosure, which are generally described and illustrated herein, may be arranged and designed in a variety of different configurations. Therefore, the following detailed description of the embodiments of the present disclosure provided in the accompanying drawings is not intended to limit the scope of the claimed present disclosure, but merely represents a selected embodiment of the present disclosure. Based on the embodiments of the present disclosure, all other embodiments obtained by a person skilled in the art without creative efforts shall fall within the protection scope of the present disclosure.

In the following, the terms ‘comprising,’ ‘including,’ ‘having,’ and their cognates, as used in various embodiments of the present disclosure, are intended to express inclusion of specific features, numbers, steps, operations, elements, components, or combinations thereof. They should not be construed to exclude the presence of one or more other features, numbers, steps, operations, elements, components, or combinations thereof, or exclude the possibility of adding one or more features, numbers, steps, operations, elements, components, or combinations thereof. Additionally, terms such as ‘first,’ ‘second,’ ‘third,’ etc., are used for descriptive purposes only and should not be interpreted as indicating or implying relative importance.

Unless otherwise defined, all terms (including technical and scientific terms) used herein have the same meaning as commonly understood by one of ordinary skill in the art to which various embodiments of the present disclosure belong. The terms, such as terms defined in commonly used dictionaries, will be interpreted as having the same meaning as the context meaning in the relevant technical field and will not be construed as having an idealized meaning or overly formal meaning unless expressly defined in the various embodiments of the present disclosure.

Some embodiments of the present disclosure are described in detail below with reference to the accompanying drawings. In the case of no conflict, the following embodiments and features in the embodiments may be combined with each other.

Figure 1A:
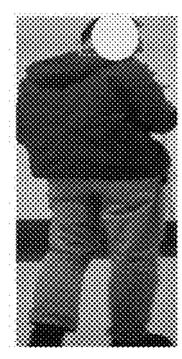
FIGS. 1A-1C show several examples of difficult pedestrian image feature extraction.
Figure 1A:
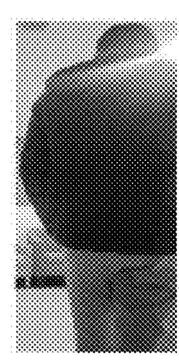
Figure 1B:
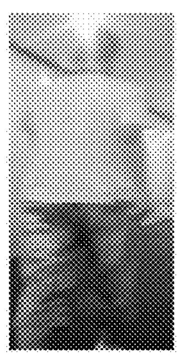
Figure 1B:
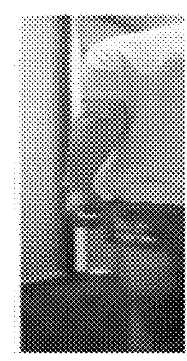
Figure 1C:
Figure 1C:
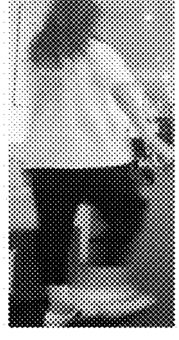
Figure 2A:
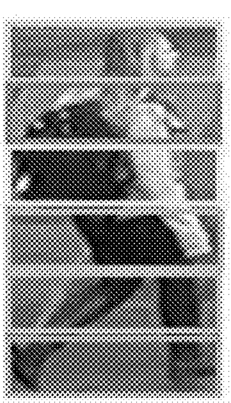
FIGS. 2A-2C show several examples of pedestrian body part localization.
Figure 2B:
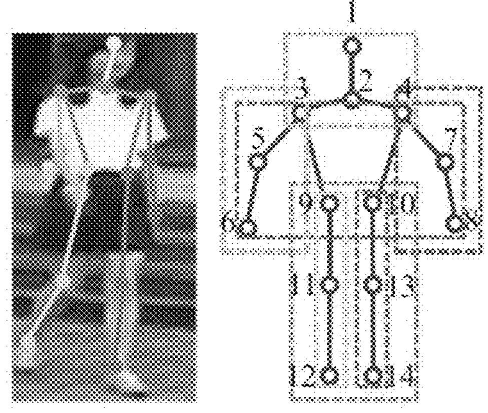
Figure 2C:
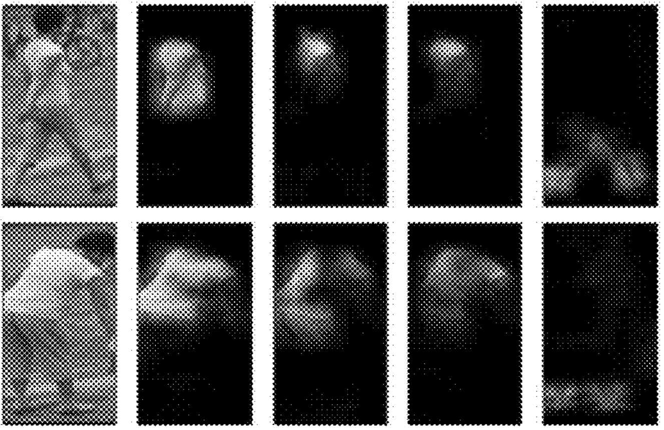

Existing algorithms for pedestrian body part feature extraction methods often need to locate body part features first, as shown in FIG. 2, and common methods for body part localization are (a) a method based on average segmentation: (b) a method for defining body parts using body key points: and (c) a method for locating the body parts using an attention model. These methods not only bring corresponding computational overheads, but also affect body part localization effect when the quality of the pedestrian image is poor, as shown in FIG. 2C.

In this regard, the present disclosure provides a method for pedestrian body part feature extraction, which adaptively learns features of body parts by a channel-based attention mechanism, without separately locating the body part features specifically before extraction, thereby avoiding the problem that the body parts need to be localized first as in a conventional pedestrian body part feature extraction algorithm, and thus reducing the difficulty of extraction, etc.

It should be noted that the idea of extracting body part features from structural information of a research object provided in the present disclosure can not only be applied to a pedestrian body part scenario, but also to tasks related to objects with rigid structures, such as face identification, vehicle identification, etc., which can be adapted according to actual needs.

Figure 3:
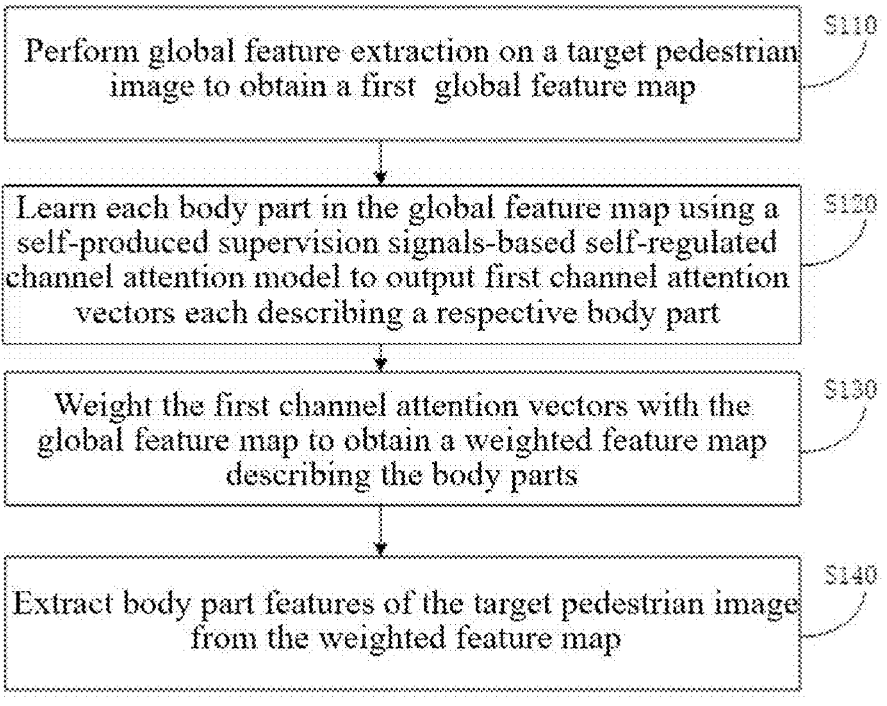
FIG. 3 shows a flowchart of a method for pedestrian body part feature extraction in an embodiment of the present disclosure.

The method for pedestrian body part feature extraction is described in detail below. Referring to FIG. 3, exemplarily, the method for pedestrian body part feature extraction includes the following operations.

S110, performing global feature extraction on a target pedestrian image to obtain a global feature map.

In an embodiment, when body part feature extraction is required for a pedestrian image, the pedestrian image is input into a constructed backbone network for global information extraction to obtain a global feature map of the pedestrian image, then the global feature map is input into a self-produced supervision signals-based self-regulated channel attention model for corresponding processing, and finally corresponding body part features are extracted.

It should be understood that the backbone network is mainly used for global feature extraction, but not for more detailed body part feature extraction, so requirements for the network are not high. Thus, the backbone network may be a common deep learning network, for example, includes, but is not limited to, heavyweight networks such as ResNet, and lightweight networks such as MobileNet, ShuffleNet, etc., which is not limited herein.

S120, learning each of body parts in the global feature map using a self-produced supervision signals-based self-regulated channel attention model to output first channel attention vectors each describing a respective one of the body parts.

It should be understood that the self-produced supervision signals-based self-regulated channel attention model herein needs to be obtained by model training in advance. The self-produced supervision signals-based self-regulated channel attention model is a channel-based attention mechanism. In this embodiment, the self-produced supervision signals-based self-regulated channel attention model is mainly configured to adaptively learn the body part features from the global feature image using the channel attention mechanism, in which each body part feature has a corresponding feature channel, which avoids specific localization of the body parts, and thus greatly reduces the computational overhead of the entire body part feature extraction process.

It should be noted that the self-produced supervision signals-based self-regulated channel attention model has some differences in structures between a model training phase and a utilization deployment phase. That is, in the model training phase, a supervision signal is utilized to supervise an output channel attention vector of a body part to ensure that the output channel attention vector is able to focus on desired body part feature information, the supervision signal is withdrawn when supervision training is completed, and only a structure capable of adaptively outputting the channel attention vector that meets the requirements is retained.

In one embodiment, in the model training phase, the self-produced supervision signals-based self-regulated channel attention model includes two branches. A first branch is configured to perform body part feature learning on a global feature map of training data (i.e., pedestrian images used for training) to output second channel attention vectors of body parts in the global feature map. A second branch is mainly configured to generate supervision signals based on batch training data for supervised training of the first branch until a predetermined distance condition is satisfied between a respective one of the second channel attention vectors output from the first branch and a corresponding one of the supervision signals. The predetermined distance condition, for example, includes, but is not limited to, the distance being very small, the distance being less than a smaller value, or the distance being within a small range of values, etc. Specifically, the second branch generates the supervision signals based on the batch training data, and it should be understood that the supervision signals are used to supervise channel attention learning of the first branch, so as to ensure that the output channel attention vectors of the first branch are able to successfully learn information of the body parts. Furthermore, upon completion of the training, the second branch in the self-produced supervision signals-based self-regulated channel attention model is taken away and only the first branch is retained for actual deployment.

Figure 4:
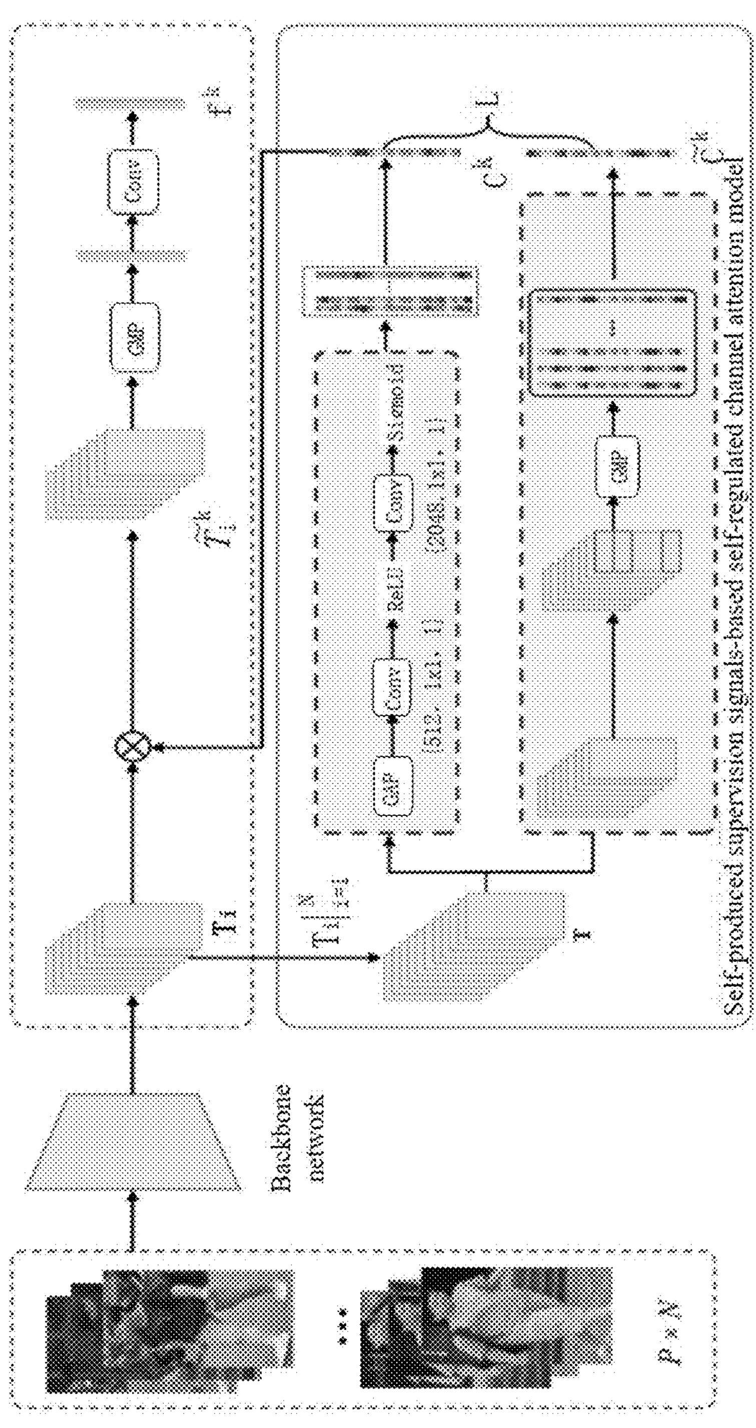
FIG. 4 shows an architectural schematic diagram of the method for pedestrian body part feature extraction in an embodiment of the present disclosure.

In this embodiment, the first branch of the self-produced supervision signals-based self-regulated channel attention model is a Squeeze-and-Excitation module. Specifically, as shown in FIG. 4, the first branch includes a global average pooling (GAP) layer, a first convolutional (Conv) layer, and the second convolutional (Conv) layer that are connected in sequence. An output of the first convolutional layer uses a rectified linear unit (RELU) function as an activation function, and an output of the second convolutional layer uses a Sigmoid function as the activation function.

The second branch of the self-produced supervision signals-based self-regulated channel attention model mainly includes a global max pooling (GMP) layer for carrying out global max pooling processing. In addition to the GMP structure, the second branch also needs to pre-process the global feature map input into the GMP structure, as well as post-process the output features to generate the supervision signal used to supervise the channel attention vectors.

Figure 5:
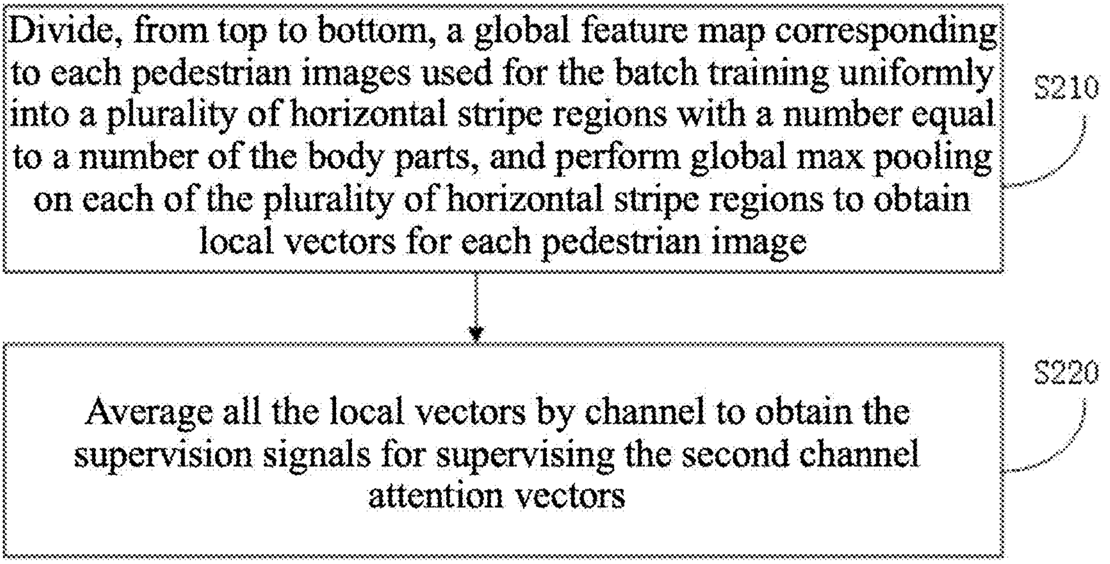
FIG. 5 shows a flowchart of supervision signal generation in an embodiment of the present disclosure.

A process of the second branch generating the supervision signal based on the batch training data requires the following operations, as shown in FIG. 5.

S210, dividing, from top to bottom, a global feature map corresponding to each pedestrian images used for the batch training uniformly into a plurality of horizontal stripe regions with a number equal to a number of the body parts, and performing global max pooling on each of the plurality of horizontal stripe regions to obtain local vectors for each pedestrian image.

S220, averaging all the local vectors by channel to obtain the supervision signals for supervising the second channel attention vectors.

Typically, batch training data is constructed before the model training, e.g., as shown in FIG. 4, a batch of training data includes P pedestrians, and each pedestrian has N pedestrian images (i.e., images of walking states). In an embodiment, the number of body parts is denoted as K, then an $i^{th}$ pedestrian image is uniformly divided to obtain K horizontal stripe regions, and then GMP is performed on the K horizontal stripe regions to obtain corresponding local vectors, denoted as $$f_i^k,$$

where k denotes a $k^{th}$ horizontal stripe region, which takes values of 1, 2, . . . , K. It should be understood that the local vectors here are body part features localized based on the average division method. The local vectors $$f_i^k$$

of all training data are then averaged according to corresponding channels to obtain channel-invariant supervision signals (here denoted as $\hat{C}^k$).

For example, assuming K=4, for the first pedestrian image, $$f_1^1, f_1^2, f_1^3, f_1^4.$$

Similarly, for the second pedestrian image, $$f_2^1, f_2^2, f_2^3, f_2^4,$$

and for the $M^{th}$ pedestrian image, $$f_M^1, f_M^2, f_M^3, f_M^4.$$

Therefore, the local vectors of the same channel number are summed up and averaged, so that the supervision signals $$\hat{C}^k$$

are formed by the average values of all channels.

Furthermore, the generated supervision signals $$\hat{C}^k$$

are utilized to supervise the learning of the body part information until the first branch is able to output channel attention vectors $C^k$ of the body parts that satisfy the distance requirement, where k=1, 2, 3, . . . , K, and K is a total number of the body parts. In the model training process, for example, the self-produced supervision signals-based self-regulated channel attention model aims at minimizing a cosine distance between the respective one of the second channel attention vectors output from the first branch and the corresponding one of the supervision signals generated by the second branch during the supervised training of the first branch, so that the trained self-produced supervision signals-based self-regulated channel attention model is able to ensure that the second output channel attention vectors is able to meet the learning requirements. At this time, a representation of the cosine distance between the respective one of the second channel attention vectors and the corresponding one of the supervision signals is as follows:

$$L = \frac{1}{K}\sum_{k=1}^{K} D\left(\hat{C}^k, C^k\right);$$

where L denotes a loss value during training, and D denotes the cosine distance. It should be understood that this cosine distance is utilized to evaluate the learning ability of the first branch until the output channel attention vectors $C^k$ meet the distance requirement. Then, the second branch is removed from the self-produced supervision signals-based self-regulated channel attention model, thereby obtaining the trained self-produced supervision signals-based self-regulated channel attention model.

For the above operation S120, in an embodiment, the global feature map corresponding to the target pedestrian image is input into the trained self-produced supervision signals-based self-regulated channel attention model, and desired channel attention vectors $C^k$ of the body parts are predicted and output.

S130, weighting the first channel attention vectors with the global feature map to obtain a weighted feature map describing the body parts.

In one embodiment, the output first channel attention vectors are weighted with the global feature map by the following formula:

$$\tilde{T}_i^k = T_i \otimes C^k;$$

where the symbol $\otimes$ is a channel-by-channel multiplication operation, $\tilde{T}_i^k$ is the weighted feature map of the $i^{th}$ pedestrian image, $T_i$ is the global feature map of the $i^{th}$ pedestrian image, and $C^k$ is the first channel attention vectors, where k=1, 2, 3, . . . , K.

It should be understood that the body part features in the global feature map are more focused and prominent by weighting the learned channel attention vectors with respect to the body parts with the global feature map, which further facilitates subsequent direct extraction of the body part features.

S140, extracting body part features of the target pedestrian image from the weighted feature map.

In an embodiment, the weighted feature map is input into a body part feature extraction structure after being obtained to extract desired body part features $f^k$. Further, subsequent tasks such as pedestrian re-identification are able to be performed based on the extracted body part features. For example, similarity of two pedestrian images is able to be calculated based on the body part similarity weighting.

It should be understood that the body part feature extraction structure used herein is able to be extracted only by a relatively simple structure. For example, as shown in FIG. 4, the body part feature extraction structure includes a global max pooling (GMP) layer and a convolutional (Conv) layer set in sequence, and it should be understood that the body part feature structure here is only an example, which may be adapted according to actual needs and is thus not limited here.

The method for pedestrian body part feature extraction provided in the present disclosure quickly and accurately extracts the pedestrian body part features by using the self-produced supervision signals-based self-regulated channel attention model to adaptively learn the body part features in the pedestrian image. On the one hand, this avoids the drawback of the conventional pedestrian body part feature extraction algorithm that needs to locate the body parts first, and reduces corresponding computational overhead. On the other hand, for low-quality pedestrian images with blur problem, the quality of the extracted body part features is not affected by the inability to accurately locate the body part features.

Figure 6:
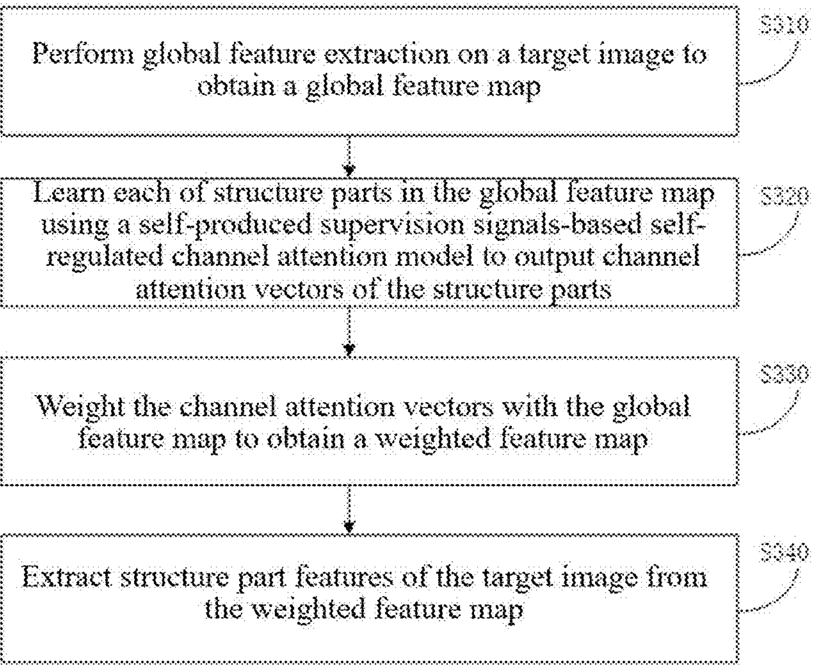
FIG. 6 shows a flowchart of a method for rigid structure part feature extraction in an embodiment of the present disclosure.

Referring to FIG. 6, based on the method in the above embodiments, the present disclosure further provides a method for rigid structure part feature extraction, which is able to be used, e.g., on tasks related to objects with rigid structures, such as face identification, vehicle identification, etc., i.e., the technical ideas in the method in the above embodiments are used to improve the extraction efficiency and the like by using the self-produced supervision signals-based self-regulated channel attention model to learn features of the parts in the global feature map.

In an embodiment, the method for rigid structure part feature extraction includes the following operations.

S310, performing global feature extraction on a target image to obtain a global feature map.

S320, learning each of structure parts in the global feature map using a self-produced supervision signals-based self-regulated channel attention model to output channel attention vectors of the structure parts.

It should be understood that in the model training process, the self-produced supervision signals-based self-regulated channel attention is able to be obtained by utilizing the supervision signals for supervised training as described in the above embodiments, and the supervision signals are removed after the training is completed to perform the actual deployment.

S330, weighting the channel attention vectors with the global feature map to obtain a weighted feature map.

S340, extracting structure part features of the target image from the weighted feature map.

It should be appreciated that some of the optional aspects of the method for pedestrian body part feature extraction in the above embodiments are equally applicable to the method for rigid structure part feature extraction, and therefore the description will not be repeated herein.

Figure 7:
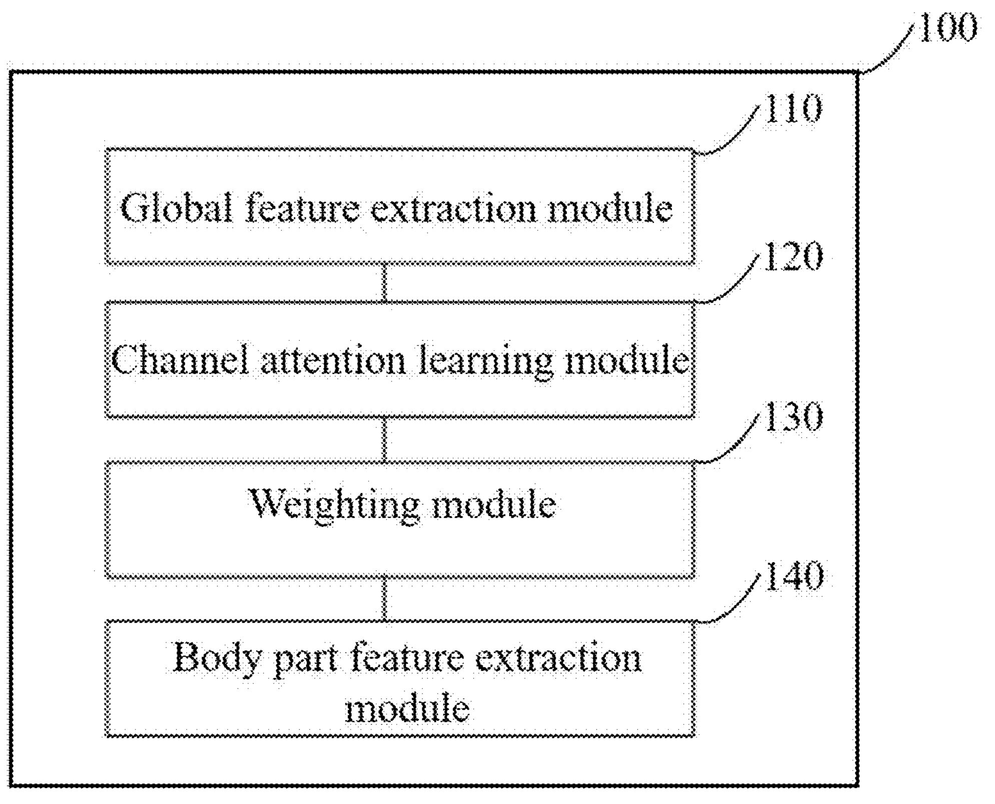
FIG. 7 shows a structural schematic diagram of an apparatus for pedestrian body part feature extraction in an embodiment of the present disclosure.

Referring to FIG. 7, based on the method for pedestrian body part feature extraction in the above embodiments, the present embodiment provides an apparatus 100 for pedestrian body part feature extraction, including: a global feature extraction module 110 for performing global feature extraction on a target pedestrian image to obtain a global feature map using a backbone network, a channel attention learning module 120 for learning each of body parts in the global feature map using a self-produced supervision signals-based self-regulated channel attention model to output first channel attention vectors each describing a respective one of the body parts, a weighting module 130 for weighting the first channel attention vectors with the global feature map to obtain a weighted feature map describing the body parts, and a body part feature extraction module 140 for extracting body part features of the target pedestrian image from the weighted feature map.

It should be understood that the apparatus in this embodiment corresponds to the method for pedestrian body part feature extraction in the above embodiments, and the optional aspects in the above embodiments are also applicable to the apparatus in this embodiment, and therefore the description will not be repeated herein.

Figure 8:
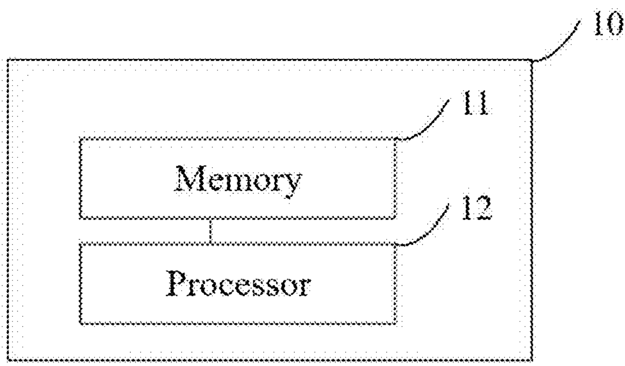
FIG. 8 shows a structural schematic diagram of a terminal device in an embodiment of the present disclosure.

FIG. 8 shows a structural schematic diagram of a terminal device 10 provided in an embodiment of the present disclosure. For example, the terminal device 10 may be a fixed installation type device, such as an indoor surveillance camera device, etc., or a mobile type device, such as a robot for surveillance, etc. Furthermore, if the terminal device is a robot, a specific shape of the terminal device is not limited, which may be a bipedal or a multipedal robot, or a wheeled robot, etc. In an embodiment, the terminal device 10 includes a memory 11 and a processor 12, the memory 11 stores a computer program, and the processor 12 executes the computer program to implement the method for pedestrian body part feature extraction or the method for rigid structure part feature extraction in the embodiments of the present disclosure, so as to be able to adaptively learn the key part features from the global feature map and extract the part features without localizing the parts first, which greatly reduces the additional computational overhead and improves the extraction efficiency, etc., compared to the conventional part feature extraction method.

The memory 11 may be, but is not limited to, a random access memory (RAM), a read-only memory (ROM), a programmable read-only memory (PROM), an erasable programmable read-only memory (EPROM), an electrically erasable programmable read-only memory (EEPROM), etc. The memory 11 is configured to store the computer program, and the processor 12 correspondingly executes the computer program after receiving an execution instruction.

The processor 12 includes an integrated circuit chip having a signal processing capability. The processor 12 may be a general-purpose processor, including at least one of a central processing unit (CPU), a graphics processing unit (GPU), and a network processor (NP), a digital signal processor (DSP), an application specific integrated circuit (ASIC), a field programmable gate array (FPGA), other programmable logic devices, discrete gates or transistor logic devices, and discrete hardware components. The general-purpose processor may be a microprocessor or the processor may be any conventional processor or the like, which is able to implement or perform methods, steps, and logical block diagrams disclosed in the embodiments of the present disclosure.

In this embodiment, the processor 12 may be an integrated circuit chip having a signal processing capability. The processor 12 may be a general-purpose processor, including at least one of a central processing unit (CPU), a graphics processing unit (GPU), and a network processor (NP), a digital signal processor (DSP), an application specific integrated circuit (ASIC), a field programmable gate array (FPGA), or other programmable logic devices, discrete gates or transistor logic devices, and discrete hardware components. The general-purpose processor may be a microprocessor or the processor may be any conventional processor or the like, and may implement or perform the methods, steps, and logical block diagrams disclosed in the embodiments of the present disclosure.

The present application further provides a non-transitory readable storage medium, configured to store the computer program used in the terminal device.

In the several embodiments provided in the present disclosure, it should be understood that the disclosed apparatus/device and method may also be implemented in other manners. The apparatus/device embodiments described above are merely illustrative, for example, the flowcharts and structural diagrams in the drawings illustrate the architecture, functionality, and operation of possible implementations of apparatuses, methods, and computer program products according to various embodiments of the present disclosure. In this regard, each block in the flowchart or block diagrams may represent a module, segment, or portion of code that includes one or more executable instructions for implementing specified logical functions. It should also be noted that, in an alternative implementation, the functions noted in the block may occur out of the order noted in the accompanying drawings. For example, two blocks shown in succession may, in fact, be executed substantially in parallel, which may sometimes be executed in a reverse order, depending upon the functions involved. It should also be noted that each block in the structural diagrams and/or flowchart, and combinations of blocks in the structural diagrams and/or flowchart, may be implemented with dedicated hardware-based systems that perform specified functions or acts, or may be implemented in combinations of special purpose hardware and computer instructions.

In addition, the functional modules or units in the embodiments of the present disclosure may be integrated together to form an independent portion, or each of the modules may exist alone, or two or more modules may be integrated to form an independent portion.

When the functions are implemented in the form of a software functional module and sold or used as an independent product, the functions may be stored in a non-transitory computer-readable storage medium. Based on such understanding, the technical solutions of the present disclosure may be embodied in the form of a software product in essence, or the part that contributes to the prior art or a portion of the technical solution may be embodied in the form of a software product. The computer software product is stored in a non-transitory storage medium and includes several instructions for enabling a computer device (which may be a smart phone, a personal computer, a server, or a network device, etc.) to perform all or some of the processes in the methods described in the embodiments of the present disclosure. The above storage medium includes various media that can store program codes, such as a USB flash disk, a mobile hard disk, a read-only memory (ROM), a random access memory (RAM), a magnetic disk, or an optical disc.

The above embodiments are merely intended for describing technical solutions of the present disclosure. However, the protection scope of the present disclosure is not limited thereto, and any person skilled in the art could easily conceive changes or substitutions within the technical scope disclosed in the present disclosure, all of which should be covered within the protection scope of the present disclosure.

What is claimed is:

1. A method for pedestrian body part feature extraction, comprising:

performing global feature extraction on a target pedestrian image to obtain a global feature map;

learning each of body parts in the global feature map using a self-produced supervision signals-based self-regulated channel attention model to output first channel attention vectors each describing a respective one of the body parts;

weighting the first channel attention vectors with the global feature map to obtain a weighted feature map describing the body parts; and extracting body part features of the target pedestrian image from the weighted feature map;

wherein, in a model training phase, the self-produced supervision signals-based self-regulated channel attention model includes:

a first branch configured to perform body part feature learning on a global feature map of training data to output second channel attention vectors, wherein each body part feature has a corresponding feature channel; and a second branch configured to generate supervision signals based on batch training data and perform supervised training of the first branch using the supervision signals, wherein the supervision signals are configured to supervise channel attention learning of the first branch, and the second branch is removed from the self-produced supervision signals-based self-regulated channel attention model in response to completion of the supervised training.

2. The method according to claim 1, wherein the supervised training is terminated in response to a distance between a respective one of the second channel attention vectors output from the first branch and a corresponding one of the supervision signals generated by the second branch during the supervised training of the first branch falling within a preset range of values or being less than a preset threshold.

3. The method according to claim 2, wherein the first branch includes a global average pooling layer, a first convolutional layer and a second convolutional layer connected in sequence, and wherein outputs of the first convolutional layer and the second convolutional layer use a rectified linear unit (RELU) function and a Sigmoid function as activation functions, respectively.

4. The method according to claim 2, wherein the second branch includes a global max pooling layer, and the second branch being configured to generate the supervision signals based on the batch training data includes:

the batch training data including pedestrian images for batch training;

dividing, from top to bottom, a global feature map corresponding to each pedestrian image used for the batch training uniformly into a plurality of horizontal stripe regions with a number equal to a number of the body parts, and performing global max pooling on each of the plurality of horizontal stripe regions to obtain local vectors for each pedestrian image; and averaging all the local vectors by channel to obtain the supervision signals for supervising the second channel attention vectors.

5. The method according to claim 2, wherein the self-produced supervision signals-based self-regulated channel attention model aims at minimizing a cosine distance between the respective one of the second channel attention vectors output from the first branch and the corresponding one of the supervision signals generated by the second branch during the supervised training of the first branch, and the distance is the cosine distance.

6. The method according to claim 1, wherein the first channel attention vectors are weighted with the global feature map by the following formula:

$$\tilde{T}_i^k = T_i \otimes C^k,\ k = 1, 2, 3, \ldots, K;$$

wherein, $\tilde{T}_i^k$ is the weighted feature map of an $i^{th}$ pedestrian image, $T_i$ is the global feature map of the $i^{th}$ pedestrian image, $C^k$ is the first channel attention vectors, and K is a number of the body parts.

7. The method according to claim 1, wherein the target pedestrian image is input into a backbone network for the global feature extraction.

8. The method according to claim 7, wherein the backbone network includes at least one of ResNet, MobileNet, or ShuffleNet.

9. A method for rigid structure part feature extraction, comprising:

performing global feature extraction on a target image to obtain a global feature map;

learning each of structure parts in the global feature map using a self-produced supervision signals-based self-regulated channel attention model to output first channel attention vectors of the structure parts;

weighting the first channel attention vectors with the global feature map to obtain a weighted feature map; and extracting structure part features of the target image from the weighted feature map;

wherein, in a model training phase, the self-produced supervision signals-based self-regulated channel attention model includes:

a first branch configured to perform structure part feature learning on a global feature map of training data to output second channel attention vectors, wherein each structure part feature has a corresponding feature channel; and a second branch configured to generate supervision signals based on batch training data and perform supervised training of the first branch using the supervision signals, wherein the supervision signals are configured to supervise channel attention learning of the first branch, and the second branch is removed from the self-produced supervision signals-based self-regulated channel attention model in response to completion of the supervised training.

10. The method according to claim 9, wherein the target image is input into a backbone network for the global feature extraction.

11. The method according to claim 10, wherein the backbone network includes at least one of ResNet, MobileNet, or ShuffleNet.

12. A terminal device, comprising a processor and a memory, wherein the memory stores a computer program, and the processor executes the computer program to implement a method for pedestrian body part feature extraction; wherein the method includes:

performing global feature extraction on a target pedestrian image to obtain a global feature map;

learning each of body parts in the global feature map using a self-produced supervision signals-based self-regulated channel attention model to output first channel attention vectors each describing a respective one of the body parts;

weighting the first channel attention vectors with the global feature map to obtain a weighted feature map describing the body parts; and extracting body part features of the target pedestrian image from the weighted feature map;

wherein, in a model training phase, the self-produced supervision signals-based self-regulated channel attention model includes:

a first branch configured to perform body part feature learning on a global feature map of training data to output second channel attention vectors, wherein each body part feature has a corresponding feature channel; and a second branch configured to generate supervision signals based on batch training data and perform supervised training of the first branch using the supervision signals, wherein the supervision signals are configured to supervise channel attention learning of the first branch, and the second branch is removed from the self-produced supervision signals-based self-regulated channel attention model in response to completion of the supervised training.

13. The terminal device according to claim 12, wherein the supervised training is terminated in response to a distance between a respective one of the second channel attention vectors output from the first branch and a corresponding one of the supervision signals generated by the second branch during the supervised training of the first branch falling within a preset range of values or being less than a preset threshold.

14. The terminal device according to claim 13, wherein the first branch includes a global average pooling layer, a first convolutional layer and a second convolutional layer connected in sequence, and wherein outputs of the first convolutional layer and the second convolutional layer use a rectified linear unit (RELU) function and a Sigmoid function as activation functions, respectively.

15. The terminal device according to claim 13, wherein the second branch includes a global max pooling layer, and the second branch being configured to generate the supervision signals based on the batch training data includes:

the batch training data including pedestrian images for batch training;

dividing, from top to bottom, a global feature map corresponding to each pedestrian image used for the batch training uniformly into a plurality of horizontal stripe regions with a number equal to a number of the body parts, and performing global max pooling on each of the plurality of horizontal stripe regions to obtain local vectors for each pedestrian image; and averaging all the local vectors by channel to obtain the supervision signals for supervising the second channel attention vectors.

16. The terminal device according to claim 15, wherein the self-produced supervision signals-based self-regulated channel attention model aims at minimizing a cosine distance between the respective one of the second channel attention vectors output from the first branch and the corresponding one of the supervision signals generated by the second branch during the supervised training of the first branch, and the distance is the cosine distance.

17. The terminal device according to claim 12, wherein the first channel attention vectors are weighted with the global feature map by the following formula:

$$\hat{T}_i^k = T_i \otimes C^k, k = 1, 2, 3, \ldots, K;$$

wherein, $$\hat{T}_i^k$$

is the weighted feature map of an $i^{th}$ pedestrian image, $T_i$ is the global feature map of the $i^{th}$ pedestrian image, $C^k$ is the first channel attention vectors, and K is a number of the body parts.

18. The terminal device according to claim 12, wherein the target pedestrian image is input into a backbone network for global feature extraction.

19. The terminal device according to claim 18, wherein the backbone network includes at least one of ResNet, MobileNet, or ShuffleNet.

20. A non-transitory readable storage medium storing a computer program, wherein the computer program when executed on the processor causes the processor to implement the method according to claim 1.

* * * * *